United States Patent [19]

Raybuck

[11] Patent Number: 4,667,809

[45] Date of Patent: May 26, 1987

[54] APPARATUS FOR ALIGNING SIGNATURES

[75] Inventor: William B. Raybuck, Cocoa, Fla.

[73] Assignee: Trimmer Machine Co., Inc., Dorset, Vt.

[21] Appl. No.: 706,972

[22] Filed: Mar. 1, 1985

Related U.S. Application Data

[62] Division of Ser. No. 543,362, Oct. 19, 1983, Pat. No. 4,511,131.

[51] Int. Cl.[4] ............................................ B65G 47/26

[52] U.S. Cl. .................................. 198/456; 198/627; 198/628; 271/221; 271/240

[58] Field of Search ............... 198/456, 644, 628, 627, 198/626; 271/221, 240

[56] References Cited

U.S. PATENT DOCUMENTS

| | | | |
|---|---|---|---|
| 1,733,221 | 10/1929 | Fuller | 198/456 |
| 2,652,769 | 9/1953 | Wehr | 198/627 |
| 3,228,357 | 1/1966 | Bruschke et al. | 198/626 |
| 3,294,261 | 12/1966 | Cloutier, Jr. | 198/626 |
| 3,951,257 | 4/1976 | Storace et al. | 198/628 |
| 4,015,843 | 4/1977 | Tennant | 271/240 |
| 4,381,108 | 4/1983 | Newsome | 198/456 |
| 4,511,131 | 4/1985 | Raybuck | 270/54 |

FOREIGN PATENT DOCUMENTS

| | | | |
|---|---|---|---|
| 567520 | 12/1958 | Canada | 198/628 |
| 55-66451 | 5/1980 | Japan | 271/221 |
| 768686 | 2/1957 | United Kingdom | 198/626 |
| 1407164 | 9/1975 | United Kingdom | 198/628 |
| 2092978 | 8/1982 | United Kingdom | 198/628 |

*Primary Examiner*—Joseph E. Valenza
*Attorney, Agent, or Firm*—Mason, Kolehmainen, Rathburn & Wyss

[57] ABSTRACT

Apparatus for aligning a moving stream of overlapping signatures includes a pair of elongated endless jogger belts mounted on supporting bases on opposite sides of said moving stream. Each belt is formed of resilient flexible sheet material mounted on edge with an inside run adapted to engage the edge of the signatures as they move between the belts. A final portion of each inside belt run is aligned parallel with the stream of signatures and spaced from the opposite belt by a distance determined by the size of the signatures. Each belt run has an entry portion joining a final portion and the spacing between the entry end of the belts is greater than the spacing between the belts at the discharge end in order to accommodate misalignment of the signatures in the stream initially entering between the belts. One of the bases is secured in fixed relation to the stream and the other base is resiliently biased toward the belt on the fixed base to resiliently engage the adjacent edges of the signatures and move the signatures into alignment with the opposite edges biased against the belt on the fixed base. The belts are driven at a speed equal to that of the moving stream of signatures.

13 Claims, 10 Drawing Figures

Fig. 3
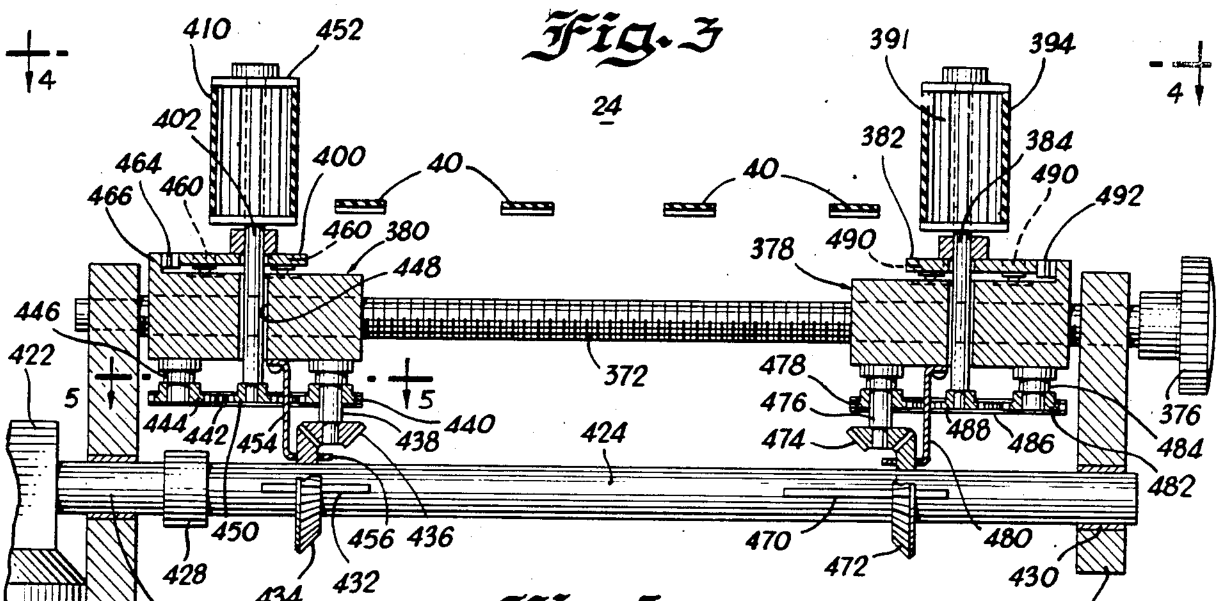
Fig. 5
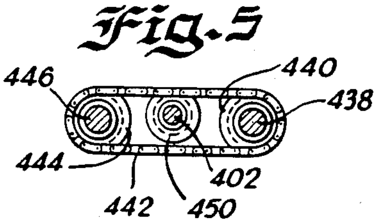
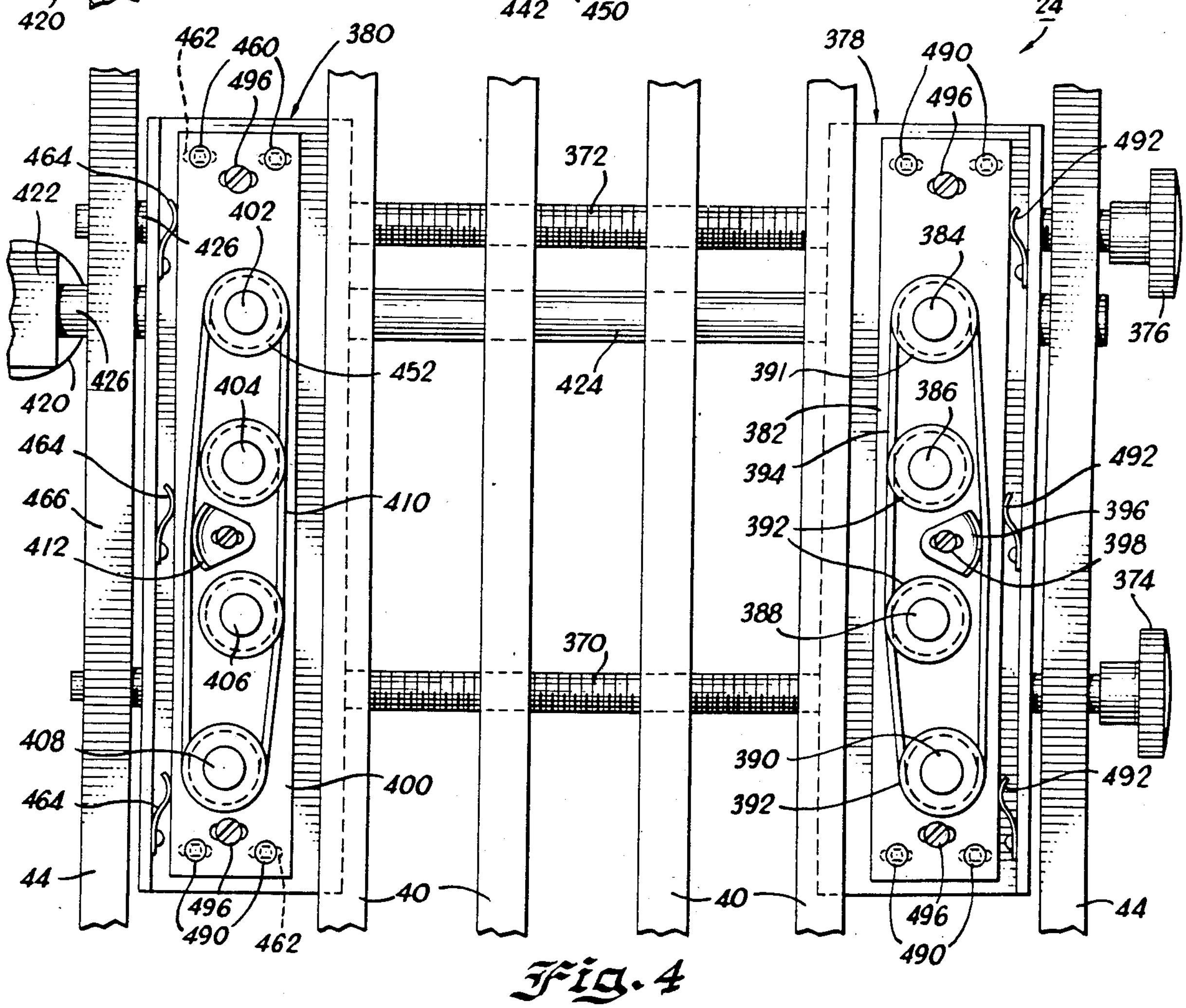
Fig. 4

APPARATUS FOR ALIGNING SIGNATURES

RELATED APPLICATION

The present invention is a division of my copending application Ser. No. 543,362 filed Oct. 19, 1983, now U.S. Pat. No. 4,511,131, and is assigned to the same assignee.

BACKGROUND OF THE INVENTION

1. Field of the Invention

The present invention relates to methods and apparatus for aligning and trimming folded printed paper booklets commonly known as signatures, which are supplied in a continuous shingled, i.e. overlapping, stream from a preceding web press, combination folder or flow folding station.

2. Description of the Prior Art

Various arrangements have been heretofore proposed for aligning and trimming a continuous stream of shingled signatures. In general, these arrangements involve a series of smooth belts which hold the signatures between them as they move past a trimming station. These belts are driven by friction rollers and must be highly tensioned in order to grip the signatures and move them past the cutting wheels of the trimming station. However, when the signatures are flowing at a high rate of speed, such as 30,000 signatures per hour, and the preceding press or folding stations malfunctions, the signatures may bunch up and in attempting to pass through the trimmer will cause either one or more of the belts to break. In some instances, the belts in prior trimming apparatus have been broken twice in a single eight hour shift of operation. If the tension on these belts is reduced in an effort to reduce such breakage, the signatures are not held firmly as they pass by the cutting wheels and non parallel or uneven cuts are produced. Also, as the tension is reduced to avoid breakage the variation in cut registers increases due to movement of the signatures as they flow past the cutting wheels. With many prior art arrangements the variation in width is greater than $\pm\frac{1}{8}$ of an inch, a condition which is accepted with great dissatisfaction in the industry.

A further disadvantage of prior art signature trimming apparatus in that this equipment usually trims each edge of the signature stream by passing if through opposed overlapping cutting wheels which trim the edge by a scissors type action. Since the edge of the signatures is not held against a surface while it is cut, there is difficulty in maintaining a straight cut and the trimmed edges may have an undesired ripple effect.

The stream of signatures from the printing press or folding station are usually considerably out of alignment. Accordingly, it is necessary to employ apparatus, commonly known as a jogger, to align the signatures before they are fed to the trimming apparatus. As stated heretofore, signatures consist of sheets of paper upon which images have been placed by a web press after which the sheets of paper are folded in half a number of times. One side of the final signature will contain nested folds and the side adjacent to it will have independent folds. When the folder makes a series of folds on a sheet of paper, air tends to become trapped within the folds and the folder is usually arranged to perforate the folds which are independent so that air can escape and the signature will lie flatter. The side wherein the folds are nested is called the spline and forms the back of the signature. At right angles to the spline are the independent folds which are perforated. The other two sides of the signature include loose sheets of paper, are never in alignment, and also lack rigidity. Accordingly, signatures are always aligned either against the spline or the side with the independent folds. However, when the top and bottom of the signature is trimmed, as in conventional two knife trimmers, the spline is positioned at right angles to the direction of flow and hence the signature can only be aligned against the independent fold side.

Conventional jogging apparatus employs a fixed slide plate on one side of the signature stream and a pivoted jogger plate on the other side which is pivoted back and forth so that it alternately slightly compresses the signature flow against the fixed slide plate and them releases the signature flow to provide a rough alignment of the overlapped signatures. Since the pivoted jogger plate strikes the edge of the signature stream at a slight angle it inherently creates disturbances within the signature flow and causes the signature to bounce back slightly from the fixed plate in random fashion. As a result, the best tolerance which can be achieved with this type of apparatus is only $\pm\frac{1}{8}$ of an inch and this tolerance is oftentimes exceeded. If more precise alignment is desired it is customary to use a second similar jogging apparatus on which the pivoted jogger plate has a reduced swing and is moved back and forth more slowly so that it engages a signature a fewer number of times. However, the folded signatures may come out of different types of presses or folders with the independent fold side of the signature on either the inboard or the outboard side of the conveyor. This means that under some conditions the signatures will be aligned by pushing the loose sheet side of the signature against the fixed plate which results in relatively poor alignment even if two pivoted joggers are employed in series.

OBJECTS OF THE INVENTION

It is an object, therefore, to provide a new and improved method and apparatus for aligning and trimming signatures which avoids one or more of the above discussed disadvantages of prior art arrangements.

It is another object of the present invention to provide a new and improved method and apparatus for aligning and trimming signatures wherein the signature stream is tightly held between opposed conveyor belt means without causing breakage of the belts when bunched up signatures occur in the stream.

It is another object of the present invention to provide a new and improved method and apparatus for aligning and trimming signatures wherein the signature stream is normally held firmly between opposed conveyor belt systems as signatures are trimmed with provision being made for handling bunched up signatures without causing breakage of the belts.

It is another object of the present invention to provide a new and improved method and apparatus for aligning and trimming signatures in which the incoming signatures are accurately aligned to a tolerance of less than inch $\pm 1/32$ of an inch and are firmly held in this accurately aligned position while they are trimmed.

It is another object of the present invention to provide a new and improved method and apparatus for aligning and trimming signatures wherein the edges of the signature stream are held against a fixed surface and a single cutting wheel is employed to trim each edge of the signature stream by acting against such fixed surface.

It is another object of the present invention to provide a new and improved method and apparatus for aligning and trimming signatures wherein accurate parallel cutting of the top and bottom of the signatures is achieved with a high speed flow of signatures of either light or heavy material.

It is a further object of the present invention to provide a new and improved final alignment apparatus for precisely aligning the signatures in a moving stream by gently urging the edges of the signatures into alignment by means of opposed edge mounted jogger belts which are moving at approximately the speed of the signature stream.

It is another object of the present invention to provide a new and improved final alignment apparatus for precisely aligning the signatures in a moving stream wherein the force exerted on the edge of the stream by an edge mounted jogger belt may be varied to accommodate different thicknesses of signatures and different types of paper.

BRIEF SUMMARY OF THE INVENTION

Briefly considered, the arrangement of the present invention comprises a lower conveyor belt system consisting of a plurality of narrow belts spaced apart across the width of the signature stream which extend through both the alignment and trimmer sections of the apparatus. Two alignment stations are serially positioned along the lower conveyor belt system. The first alignment station comprises a fixed slide plate and a jogger plate which is moved bodily back and forth in a direction perpendicular to the conveyor belts at an adjustable rate to provide a rough alignment of the incoming stream of shingled signatures which is fed to the lower conveyor belt system. The second alignment station comprises a pair of opposed edge mounted jogger belts which are moved at an adjustable speed approximately equal to the speed of the lower conveyor belt system. One of these jogger belts may be fixedly positioned in engagement with one edge of the signature stream and the other jogger belt is lightly spring biased into engagement with the other edge of the stream so that the edges of the signatures are gently urged into precise alignment as they past the second alignment station. The positions of the fixed and spring biased belts may be interchanged to accomodate signature flows in which the independent fold side of the signature is on either the inboard or the outboard side of the lower conveyor belt system so that the signatures can always be aligned by being urged against the independent fold side of the signatures.

BRIEF DESCRIPTION OF THE DRAWINGS

The invention both as to its organization and method of operation, together with further objects and advantages thereof, will best be understood by reference to the following specification taken in connection with the accompanying drawings, in which:

FIG. 3 is a sectional view taken along the line 3—3 of FIG. 1;

FIG. 4 is a sectional view taken along the line 4—4 of FIG. 3; and

FIG. 5 is a sectional view taken along the line 5—5 of FIG. 3.

DESCRIPTION OF A PREFERRED EMBODIMENT OF THE INVENTION

Figure 1:
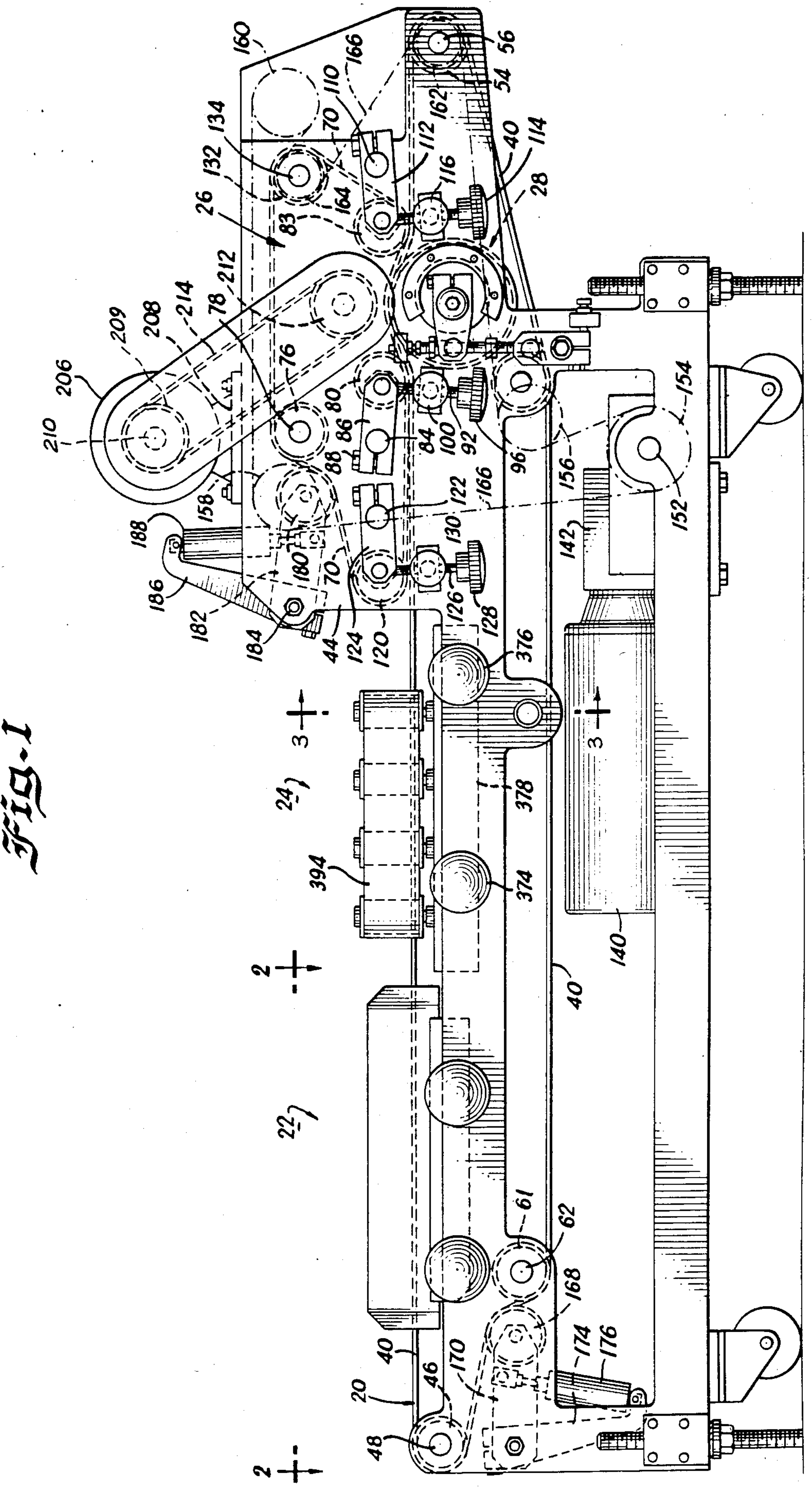
FIG. 1 is a side elevational view of an alignment and trimming apparatus embodying the features of the present invention.
Figure 2:
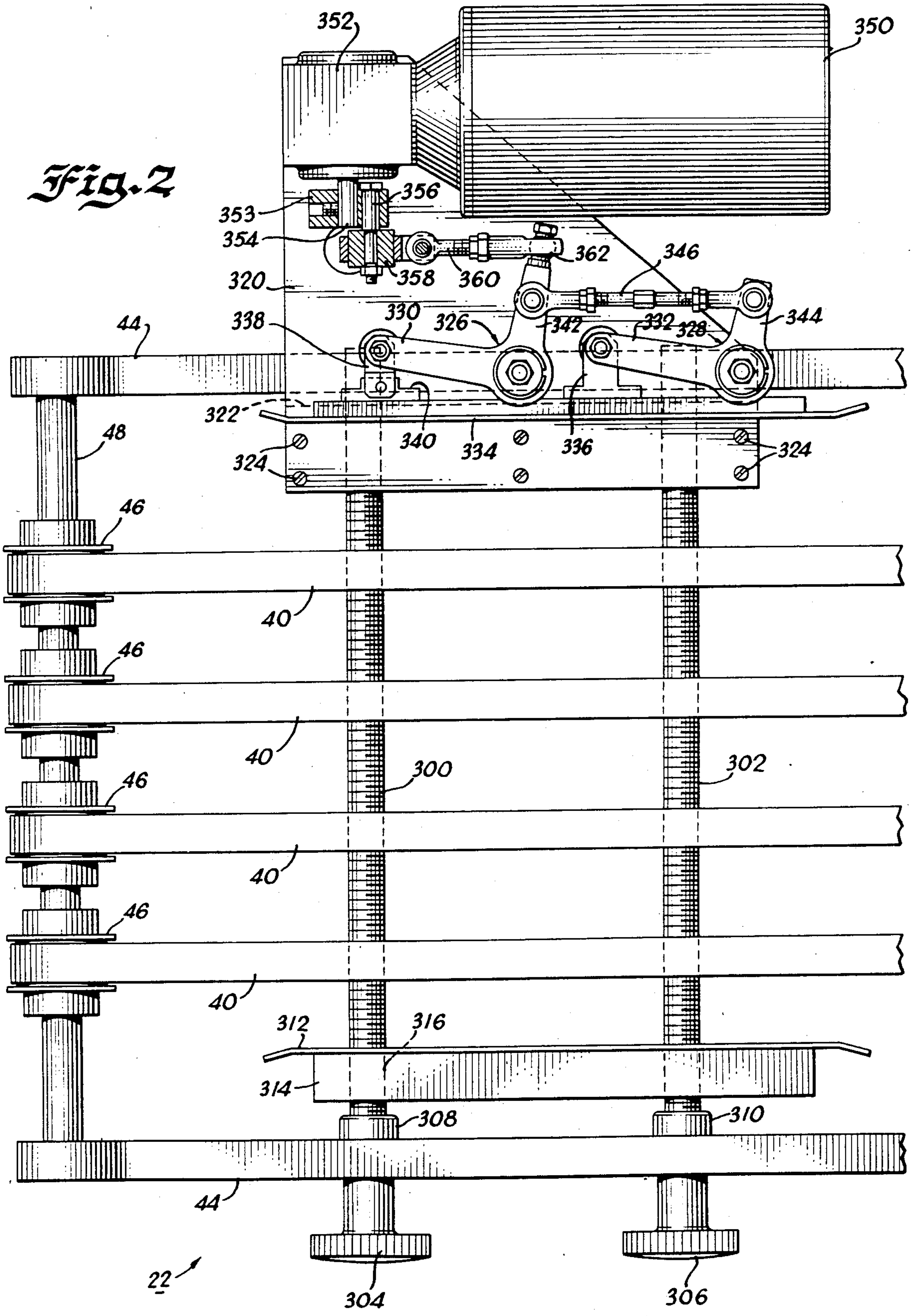
FIG. 2 is a sectional plan view taken along line 2—2 of FIG. 1.

Referring now to the drawings, the signature aligning and trimming apparatus of the present invention is therein illustrated as comprising a lower conveyor belt system indicated generally at 20 which is adapted to receive an incoming stream of shingled or overlapping signatures from a preceeding web press or folding apparatus. The signatures normally come from the press or folder with the splines thereof aligned in the direction of travel of the signature stream. It is necessary to reorient the folded signatures so that the spline is positioned transversely of the lower conveyor belt system 20 so that the top and bottom of these signatures can be trimmed after they have been aligned. This reorientation of the signatures so that the splines thereof are positioned transversely of the direction of movement of the conveyor 20 may be accomplished by any suitable 90° bump turn conveyor system or 90° flow turn conveyor system, as will be readily understood by those skilled in the art. It should also be noted that the signatures as they come from a conventional press or folder are overlapped approximately 1½ inches but this overlap may be varied by varying the speed of a single wide belt conveyor in the case of a bump turn 90° conveyor system, for example, so that the overlapping of the signatures may be adjusted as desired for different thicknesses of signatures. Preferrably, the incoming stream of signatures are shingled with a three inch overlap when relatively thick signatures, such as 64 sheet signatures are being trimmed in the apparatus of the present invention. In this connection, it will be understood that the lower conveyor belt system 20 is arranged to convey the incoming stream of signatures at a high rate of speed in the order of 30,000 to 40,000 signatures per hour, these signatures customarily having a size of 8½×11 inches or larger and being shingled with 1½ inches of signature showing in the signature stream.

The lower conveyor belt system 20 moves the incoming stream of signatures past a first alignment station indicated generally at 22 wherein the signatures are jogged laterally to provide a rough alignment of the signatures in the stream after which the signatures are conveyed to a final alignment station indicated generally at 24 wherein the edges of the signatures are engaged by edge mounted spring biased jogger belts, to be described in more detail hereinafter, for a precise alignment of the signature stream prior to the trimming operation. After the signatures have been precisely aligned by the final alignment station 24 they are engaged on their upper surface by an upper conveyor belt system indicated generally at 26 so that the signatures are gripped firmly between the lower conveyor belt system 20 and the upper conveyor belt system 26. The upper and lower conveyor systems 26, 20 with the signatures gripped firmly therebetween, are led over the large diameter rollers indicated generally at 28 in such manner that the lower conveyor belt system 20 engages the rollers 28 over a substantial portion of the periphery thereof so that the signature stream is distorted in the form of an arc as it passes over the rollers 28. As a result, the edges of the signatures are stiffened by being bent in this arc and are trimmed by means of a pair of cutting wheels, which are positioned outboard of the conveyor systems 20 and 26 and trim the edges of the signatures as they are at the top of the arc formed by being bent over the rollers 28. The cutting blades of the cutting wheels cooperate with a pair of anvil discs or plates which are secured to the outermost ones of the large rollers 28 and are provided with resilient inserts in the peripheries thereof which support the outer edges of the signature stream and provide a surface against which cutting blades 30 of the cutting wheels 30 may act as the opposite edges of the signature stream are trimmed. After the signatures have been trimmed they exit from the upper conveyor system 26 and are conveyed by the lower conveyor system 20 to the exit end of the apparatus from which they may be conveyed to suitable stacking and bundling apparatus.

Considering now in more detail the lower conveyor belt system 20, this conveyor system comprises a series of four relatively narrow belts 40 which are spaced apart across the width of the signature stream with the outermost ones of these belts being positioned inside the edges of the signature stream. The belts 40 are provided with teeth on the inner surface thereof which mesh with idler wheels which are mounted on shafts extending between the side plates 44 of the alignment and trimming apparatus of the present invention. More particularly, a first set of four toothed idler wheels 46, which are fixedly mounted in spaced apart relation along the length of a rotatable shaft 48 which is rotatably mounted in the side plates 44, are individually in engagement with the teeth of the four belts 40 comprising the lower conveyor system 20. The large diameter rollers 28 which are mounted in spaced apart relation on a rotatably mounted sleeve are also provided with teeth which are in engagement with the teeth of the belts 40. The belts 40 then extend over another series of four toothed wheels 54 which are keyed to a shaft 56 rotatably mounted between the side plates 44, the teeth of the wheels 54 being individually in engagement with the belts. In a similar manner, a set of toothed idler wheels 58 are keyed to the idler shaft 60 positioned above the lower flight of the conveyor system 20 with the teeth of the idler wheels 58 in individual engagement with the belts. A final series of four toothed idler wheels 61 are keyed to a rotatably mounted shaft 62 with the teeth of the wheels in individual engagement with the belts.

The upper conveyor system 26 likewise comprises a series of four relatively narrow belts 70 which are spaced apart across the width of the signature stream and are in vertical alignment with the belts of the lower conveyor system 20, the belts 70 being provided with teeth 72 on the inner surface thereof which engage tooth idler wheels which are rotatably mounted between the side plates 44. More particularly, a series of four toothed idler wheels 76 are keyed to the shaft 78 which is rotatably mounted between the sideplates 44 with the teeth of the wheels 76 in engagement with the teeth of the belts 70.

In order to control the arc over which the lower belt system 20 engages the periphery of the large rollers 28, a first series of toothed idler wheels 80 are positioned adjacent the entrance side of the rollers 28 with the teeth of the wheels 80 in engagement with the teeth of the upper belts and a second series of toothed idler wheels 83 are positioned on the exit side of the rollers 28 with the teeth thereof in engagement with the teeth of the upper belts 70. Both of the series of rollers 80, 83 are individually adjustable relative to the rollers 28 so as to control the arc over which the belt systems engage the large rollers 28. Considering now the manner in which the idler wheels 80 may be adjustably positioned relative to the rollers 28, the toothed idler wheels 80 are rotatably mounted on the end of a series of arms 82 which are keyed to the shaft 84 which is rotatably mounted between the side plates 44. An actuating arm 86 is clamped to the shaft 84 outboard of the front sidewall 44 and is provided with a slot within which an adjustment screw 92 is pivotally mounted by means of a threaded insert rotatably mounted in the ends of the arm 86. An adjustment knob 96 is secured to the end of the screw 92 and the screw 92 is threaded through a cylindrical insert so that the screw 92 can pivot to accommodate the pivotal movement of the arm 86. A locking knob 100 is provided to lock the screw 92 in its adjusted position. Accordingly, by adjustment of the knob 96 the arm 86 may be pivoted so that the shaft 84 is rotated and the position of the toothed idler wheels 80 may be varied to vary the point of engagement of the belts 40 with the rollers 28.

The idler wheels 83 are individually mounted on the ends of arms which are secured to the shaft 110, the outboard end of which is secured to the arm 112 so that the position of the rollers 83 may be adjusted by means of an adjustment knob 114 in a manner similar to that described in detail heretofore in connection with the adjustment of the idler wheels 80. After the idler wheels 83 have been adjusted in position may be locked in this position by means of the locking knob 116. The idler wheels 80 and 83 may both be adjusted in position to vary the amount of "wrap" of the belts 40 around the rollers 28 so that signatures of different materials, types and thicknesses may be accommodated. Preferably, the idler wheels 80 and 83 are adjusted to the minimum amount of wrap necessary for a particular cutting job.

At the forward end of the upper conveyor system 26 a series of toothed idler wheels 120 are provided in engagement with the teeth of the belts 70. Since the position of the idler wheels 80 is adjustable to vary the tension in the upper and lower belt systems it is desirable to also adjust the position of the forward set of toothed idler wheels 120 so that these idler wheels may be maintained level with the adjusted position of the rollers 80. Such adjustment of the idler wheels 120 is desirable to provide stability for the system and ensure that there is no deflection of the signature stream as it is engaged by the upper belt system 26 and moved to the cutting wheels 30. Adjustment of the toothed idler wheels 120 is accomplished in the same manner as that described in detail heretofore in connection with the idler wheels 80, the wheels 120 being individually mounted on arms which are secured to the shaft 122 which is rotatably mounted in the sidewalls 44. A control arm 124 is secured to the outboard end of the shaft 122 and may be adjusted in position so as to rotate the shaft 122 and hence vary the position of the idler wheels 120 by means of the adjustment screw 126 which is rotated by the knob 128. The screw 126 is locked in position by the locking knob 130.

The upper conveyor system 26 is completed by a set of four toothed drive wheels 132 which are keyed to the shaft 134 which is rotatably mounted between the sidewalls 44 of the apparatus, the teeth of the wheels 132 being individually in engagement with the belts 70 of the upper conveyor system 26.

The lower conveyor system 20 and the upper conveyor system 26 are both positively driven at the same speed. In addition, each belt is yieldingly tensioned by a separate air cylinder so that bunched up piles of signatures may be accommodated without breaking any of the belts of the system. More particularly, the shaft 134 is employed as a drive shaft for the upper conveyor system 26 and the shaft 56 is employed as a drive shaft for the lower conveyor system 20. A variable speed driving motor 140 is employed to drive, through a gear reduction box 142 a drive sprocket which is positioned on the end of the output shaft of the gear reduction box 142. The sprocket is connected by means of a chain to a main drive sprocket positioned on a main drive shaft 152 which also carries a larger drive sprocket 154 which is positioned on the shaft 152 behind the rear wall 44 of the apparatus. A series of idler chain drive sprockets 156, 158 and 160 are mounted on stud shafts journalled in the rear wall of the apparatus and are positioned outboard of this rear wall. Also the shafts 56 and 134 extend rearwardly beyond the rear wall of the apparatus and have drive chain sprockets 162 and 164 secured thereto. A main drive chain 166 interconnects the main drive chain sprocket 154, the idler sprockets 156, 158 and 160 and the drive sprockets 162 and 164 on the shafts 56 and 134 so that the two conveyor belt systems 20 and 26 are positively driven at a speed determined by the variable speed driving motor 140. In this connection it will be understood that the toothed wheels secured to the shaft 56 and 134 which are individually in engagement with the teeth of each of the belts of the upper and lower conveyor systems act as positive driving means for each of the belts to ensure that all of the belts of each system move in unison and at the same speed with the belts of the other conveyor system.

In order to provide for yieldingly resilient tensioning of each belt 40 of the lower conveyor belt system 42 a series of four idler wheels 168 are individually mounted on the ends of arms 170 which in turn are pivotally mounted on a shaft 172 extending between the sidewalls 44 of the apparatus. A series of four links 174 are also pivotally mounted on the shaft 172 and an air cylinder 176 is pivotally connected between the end of each of the links 174 and the corresponding arm 170. When a predetermined air pressure is supplied to the cylinders 176 these cylinders individually pivot the arms 170 about the shaft 172 and urge the idler wheels 168 into engagement with the outer surface of the belts 40 of the lower conveyor belt system 20 so as to produce a desired tension in these belts. The tension thus produced in the belts 40 holds these belts in engagement with the respective toothed idler wheels 46, 54, 58 and 61 and also holds these belts against the periphery of the large toothed rollers 28. The tension in the lower belts 40 also functions to press the signature stream against the upper belts in the region of the idler wheels 80 and 83 so that the signatures are gripped firmly from a point well before the trimming action of the cutting wheels until a point well beyond these wheels.

In order to provide yielding resilient tensioning of the belts 70 of the upper conveyor system 26 a similar series of four idler wheels 180 are pivotally mounted on the outer ends of arms 182 which are pivotally mounted on the shaft 184. A series of four links 186 are also pivotally mounted on the shaft 184 and a series of air cylinders 188 are pivotally connected between the outer ends of the links 186 and the arms 182. When a predetermined air pressure is supplied to cylinders 188 the belts 70 are individually tensioned by engagement of the idler wheels 180 with the outer surface of the belts 70. The tension thus produced in the belts 70 causes these belts to press the signature stream firmly against the lower belts 40 as the belts pass over the large rollers 28, i.e. in the region between the rollers 80 and 83 so that the signature stream is gripped firmly as the edges thereof are trimmed by the cutting wheels 30.

While the upper and lower conveyor belts systems grip the signature stream firmly during the trimming operation, it will be noted that with the arrangement of the present invention the belts are permitted to separate against the tension force exerted by the respective air cylinders in the event that a bunched up pile of signatures is present in the signature stream. Thus if a pile up of signatures occurs, the lower belt 40 can move downwardly as the pile up passes the idler wheels 120 and 180, the upper belts 70 can move upwardly against the force of the air cylinders 188 as the pile up passes over the large rollers 28, and the lower belts 40 can move downwardly against the force of the air cylinders 176 as the pile up passes under the toothed idler wheels 83. This successive slackening or yielding of the lower and upper belt systems is achieved while the belts continue to be positively driven by the chain 166 so that the signatures stream continues to be firmly held between the two belt systems and moves through the trimming section even though pile up of signatures may occur from time to time, the cushioning effect of the air cylinders 176 and 188 ensuring that abrupt increases in tension of the belts 40 and 70 to the point where the belts might break does not occur.

The tension provided by each belt system may be independently adjusted by providing separate pressure regulators to supply the air cylinders 176 and the air cylinders 188. If desired, a suitable pressure gauge may be associated with each pressure regulator so as to provide a visual indication of the pressure exerted by each set of cylinders on the respective belts of the upper and lower conveyor systems.

Considering now in more detail the operation of the cutting wheels 32 and the anvil plates 32, each of the cutting wheels includes a hub portion which may be adjustably secured by means of a set screw to a shaft which is rotatably mounted in the sidewalls 44 of the apparatus. The position of the cutting wheels may thus be varied to accommodate different widths of signatures by adjusting the position of the hub along the shaft after which the set screws are tightened.

The shaft is driven by a variable speed motor 206 which is mounted on a top plate 208 extending between the sidewalls 44 of the apparatus, the motor 206 having a drive sprocket 209 positioned on the output shaft 210 whereof which is interconnected with a sprocket 212 mounted on the shaft outboard of the sidewall 44 by means of the toothed timing belt 214. The speed of rotation of the cutting wheels may be varied by adjusting the speed of the driving motor 206 so as to accomodate signatures of different thicknesses and different types of material as well as accommodating different rates of travel the signatures through the apparatus.

Referring now in more detail to the final alignment station 24, a pair of rods 370 and 372 extend transversely of the belts 40 and are mounted in the sidewalls 44 of the apparatus, the rods 370 and 372 having the adjustment wheels 374 and 376 on the inboard end thereof. The hand wheel 374 is employed to adjust the lateral position of a first base plate assembly 378 positioned on the inboard side of the belts 40 and the hand wheel 376 is employed to adjust the lateral position of a second base plate assembly 380 which is positioned behind the outboard edge of the belts 40. Each of the base plate assemblies 378 and 380 is substantially identical. The assembly 378 includes an upper plate 382 which is slideably mounted on the base plate assembly by means to be described in detail hereinafter and has a vertical drive shaft 384 rotatably mounted therein and a plurality of fixed axle rods 386, 388 and 390 extending upwardly therefrom and secured thereto. A toothed drive wheel 391 is secured to the drive shaft 384 and toothed rollers 392 are rotatably mounted on each of the shafts 386, 388 and 390. A jogger belt 394 having teeth on the inside surface thereof is mounted edgewise on the rollers 392 and drive wheel 391. In order to adjust the tension in the belt 394 and hold it against the rollers 392, a vertically extending arcuate plate 396 is adjustably positioned on the plate 382 by means of the adjustment screw 398, the plate 396 engaging the toothed inner surface of the belt 394 and holding it away from the rollers mounted on the shafts 386 and 388 so that the belt 394 is tensioned against the opposite side of these rollers and against the drive wheel 391. It will be noted that the front roller mounted on the shaft 390 is spaced outwardly from the edge of the signature stream whereas the rollers positioned on the shafts 384, 386 and 388 are parallel to the edge of the signature stream. With this arrangement an open throat is provided for the final alignment station 24 so that the edges of the signatures are gently urged into alignment as they pass through the station 24, as will be described in more detail hereinafter.

The base assembly 380 likewise includes an upper sideable plate 400 on which is rotatably mounted the drive shaft 402 and the fixed shafts 404, 406 and 408 on which toothed wheels are mounted so as to drive the endless belt 410. An adjustable tensioning plate 412 is provided to hold the belt 410 against the rollers mounted on the shafts 402, 404 and 406, it being noted that the shaft 408 is positioned outwardly beyond the edge of the signature stream by approximately 1 inch to provide the above described open throat feature.

The base asembly 378 may be adjusted laterally of the signature stream by means of the hand wheel 374, the rod 370 being threaded in the area of the base assembly 378 to accomplish such movement and the rod 372 being unthreaded in this area to provide a guideway for sliding movement of the base assembly 378. In a similar manner the base assembly 380 may be adjusted laterally of the signature stream by adjustment of the hand wheel 376, the rod 372 being threaded in the area of the base assembly 380 and the rod 370 being unthreaded in this area to act as a guide means therefor.

In order to drive the shafts 384 and 402 so that the belts 394 and 410 are moved in the direction of the signature stream and at the same speed at the signature stream, a variable speed motor 420 is mounted on the back side of the rear sidewall 44 of the apparatus and is arranged to drive through a gear reduction box 422 a transversely extending shaft 424 which is positioned below the base assemblies 378 and 380. Preferably the output shaft 426 of the gear reduction box 422 is connected to a coupling 428 and the other end of the shaft 424 is mounted in a bearing 430 in the front sidewall 44.

Considering first the manner in which the drive shaft 402 of the rear base assembly 380 is driven from the shaft 424, the shaft 424 is provided with a key 432 which drives a bevel gear 434 arranged to slide along the the shaft 424. The bevelled gear 434 drives a meshing bevelled gear 436 which is mounted on a vertically extending stub shaft 438 which is rotatably mounted in the base assembly 380 and extends downwardly therefrom. A first timing sprocket 440 is secured to the shaft 438 above the gear 436 and drives a timing chain 442. An idler timing sprocket 444 is rotatably mounted on a stubshaft 446 which extends downwardly from the base assembly 380. The drive shaft 402, which is rotatably mounted in the upper slide plate 400, extends downwardly through a clearance opening 448 in the base assembly 380 and has a small timing sprocket 450 secured to the bottom end thereof. The timing sprocket 450 is positioned in engagement with the timing chain 442, as shown in FIG. 10, so that the toothed drive wheel 452 which is secured to the shaft 402 above the slide plate 400 drives the belt 410 in the same direction as the conveyor system 20.

In order to permit lateral movement of the base assembly 380 on the rods 370 and 372 by adjustment of the hand wheel 376 while maintaining the desired driving engagement between the shaft 424 and the drive shaft 402, a bracket 454 which is mounted on the underside of the base assembly 380 extends downwardly adjacent the rear face of the bevelled gear 434 and is provided with an offset leg portion 456 which is positioned adjacent the other face of the bevelled gear 434. Accordingly, when the base assembly 380 is moved laterally the bracket 454 engages the bevel gear 434 and slides it along the key 432 so that a driving relationship between the bevel gears 434 and 436 is maintained, it being understood that the above described lateral adjustment of the base assembly 380 is accomplished when the motor 420 is deenergized.

While the base assembly 380 may be adjusted laterally to position the belt 410 adjacent the back edge of the signature stream, it is also desirable to resiliently urge this belt into engagement with the edge of the signature stream to provide precise alignment of the signatures. To this end, the slide plate 400 is slidably mounted on the base assembly 380 by providing the single ball inserts 460 which are pressed into the plate 400, the single balls of these inserts riding in corresponding elongated grooves 462 formed in the upper surface in the base assembly 380. The grooves 462 extend perpendicularly to the direction of movement of the conveyor so as to ensure that the plate 400 is slideably mounted for limited lateral movement, in the order of ½ inch, relative to the base plate 380 in a direction perpendicular to the edge of the signature stream. As shown in FIG. 10, the timing sprocket 450 is arranged to engage the timing chain 442 so that any reaction forces on the plate 400 are in a direction away from the edge of the signature stream. These reaction forces are overcome and in addition a slight inward biasing force is provided for the upper plate 400, and hence the belt 410, by means of a series of spring arms 464 which are secured to a rear flange 466 of the base assembly 300 and engage the rear edge of the slide plate 400 and resiliently urge it inward against the reaction force of the timing chain 442 so that the belt 410 is resiliently urged inwardly against the edge of the signature stream as it is driven in the direction of this stream by the toothed drive wheel secured to the drive shaft 402.

As discussed previously, the base assembly 378 on the other side of the conveyor system 20 is also arranged to be moved laterally by adjustment of the hand wheel 374. However, in order to accommodate large variations in the width of the signature stream, such as occur when double parallel type signatures are to be trimmed, a relatively long key 470 is provided on the shaft 424 to accommodate such movement. A bevelled gear 472, similar to the bevel gear 434, is slideably mounted on the shaft 424 and is driven by the key 470, this bevelled gear being in mesh with a bevelled gear 474 connected to the bottom end of a stubshaft 476 which is rotatably mounted in the base plate assembly 378 and carries the timing sprocket 478 secured thereto. A bracket 480 is connected to the bottom surface of the base assembly 378 and is positioned on either side of the hub portion of the bevelled gear 472 so that this gear is moved along the length of the shaft 424 as the base plate assembly 378 is adjusted laterally relative to the signature stream by movement of the handwheel 374. An idler sprocket 482 is rotatably mounted on a stub shaft 484 which extends from the bottom of the base assembly 378, a timing chain 486 being driven by the sprocket 478 and driving a small timing sprocket 488 positioned on the bottom end of the drive shaft 384 which is rotatably mounted in the upper slide plate 382 of the assembly 378. It will be noted that rotation of the shaft 424 drives the shaft 476 in a direction opposite to the direction of rotation of the shaft 438 in the assembly 380 so that the belt 394 is driven in the same direction as the belt 410 of the assembly 380.

The top plate 382 is slideably mounted on the upper surface of the base assembly 378 be means of the single ball inserts 490 in a manner identical to that described in detail heretofore in connection with the plate 400. Also, the plate 382 is urged inwardly against the reaction force of the drive sprocket 488 by means of the spring arms 492, again in a manner similar to that described in connection with the assembly 380. Accordingly, the belt 394 is resiliently urged with a light spring force against the inboard edge of the signature stream so as to provide precise alignment of these signatures as they pass between the belts 394 and 410.

Although both of the top plates 382 and 400 are arranged to be resiliently urged against the edge of the signature stream, only one of these plates is so biased at a particular time, the other plate being locked in position so that its jogger belt acts as a movable but unyielding surface against which the other resiliently biased jogger belt may urge the signatures. More particularly, each of the plates 382 and 400 is arranged to be locked in position against the respective base assembly by means of the set screws 496 which extends through slots in the top plates 382 or 400 and into the upper surface of the respective base plate. The screws 496 of one of the plates 382 or 400 are tightened to lock that plate in a desired adjusted position relative to its baseplate so that the spring force of the spring arms 464 or 492 is no longer effective to move that plate. With such an arrangement either one of the plates 382 or 400 may be locked in fixed position, depending upon the position of the independent fold side of the signatures in the stream of signatures supplied to the apparatus. In the opposite assembly, the screws 496 are loosened so that they permit limited movement of the top plate in response to the spring force of the arms 464 or 492 so that the corresponding jogger belt is resiliently urged against one edge of the signature stream and urges the signatures against a fixedly positioned but moving jogger belt of the opposite assembly. In this connection it will be understood that the speed of the motor 420 is preferably variable over a range such that the jogger belts 394 and 410 move at a speed of from 80% to 120% of the speed of the conveyor to accommodate different types and thicknesses of signatures and to obtain optimum conditions for the precise alignment of a particular stream of signatures.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Final alignment apparatus for precisely aligning a moving stream of overlapping signatures, comprising:

a pair of elongated, endless jogger belts of resilient flexible sheet material mounted on edge on opposite sides of said stream, each of said belts having an inside run generally aligned for movement in the direction of flow of said stream, a final portion of each inside run aligned in parallel with said direction of flow between an intermediate position in the run and a discharge end portion of said belts, an entry portion of each inside run between an entry end of sid belts and said intermediate position angularly converging inwardly toward an opposite entry portion on the opposite belt, a pair of bases for supporting each of said belts with said entry portion and said final portion of the inside run of each belt in fixed angular divergent relationship, a first of said bases for supporting one of said belts and means for positioning said first base in fixed relation to one edge of said stream of overlapping signatures, means for driving said endless belts in the direction of flow of said stream and at the speed of said signature stream, said driving means including an upstanding drive shaft rotatably mounted on each of said bases and including a belt engaging drive wheel on an upper end and a sprocket on a lower end, chain drive means engaging each of said sprockets including a pair of spaced apart stub shafts rotatably mounted on said respective bases and including a bevel gear at a lower end, a common drive shaft extending transversely of said stream between said bases, a pair of bevel gears mounted for keyed longitudinal movement on and rotation with said common drive shaft in driving meshed engagement with said respective bevel gears on said stub shafts, and brackets on said bases for moving said pair of bevel gears longitudinally of said common drive shaft to maintain said meshed engagement as the spacing between said bases is changed, thereby providing continuous driving power for said pair of endless belts, means for adjusting the spacing between said bases in a direction transverse of said stream, a second of said bases for supporting the other of said belts, and means for resiliently positioning said second base for biasing the other of said belts to engage the other of said stream and resiliently urge said signatures against said one belt as said signatures are moved between said pair of jogger belts.

2. Apparatus as set forth in claim 1, which includes means for varying the pressure said other belt exerts on said other edge of said stream to resiliently urge said signatures against said one belt.

3. Apparatus as set forth in claim 1, wherein said belts are spaced further apart at an entry end of said inside runs than at a discharge end of said runs for initially engaging said signatures in said moving stream to accommodate misaligned signatures in said stream moving into a path directly between said belt runs.

4. Apparatus as set forth in claim 1, wherein said inside runs of said belts are arranged to move in parallel to the edges of said signature stream in said final portions of said runs at a selected spacing interval determined by the size of said signatures moving in said stream and wherein said inside runs are spaced farther apart at the entry end than said selected spacing interval to accommodate initially misaligned signatures in said stream passing said entry end into a path between said belts.

5. Apparatus as set forth in claim 1, which includes a plurality of rollers mounted on each of said bases for rotation about vertical axes aligned substantially parallel of said stream and positioned inside each of said belts, and interlocking drive means on the periphery of said rollers and the inside of each of said belts.

6. Apparatus as set forth in claim 5, wherein said drive wheel for each of said belts is positioned inside the belt and interconnected therewith for driving the belt and said plurality of rollers.

7. Apparatus as set forth in claim 5, which includes means for varying the tension in each of said belts.

8. Apparatus as set forth in claim 5, wherein each of said bases supports a plurality of rollers adjacent said final portion of said inside run, which rollers are positioned substantially in alignment, and variable tensioning means for holding each belt out of engagement with one side of the rollers intermediate a pair of end roller of each set of aligned plurality of rollers.

9. Final alignment apparatus as set forth in claim 1, wherein:

at least one of said bases includes a first element engaged by said adjusting means for movement toward and away from the other of said bases and includes a second element mounted for lateral sliding movement relative to said first element and supporting an endless jogger belt thereon, and means for resiliently biasing said second element toward the other of said bases.

10. Apparatus as set forth in claim 9, wherein:

said first and second elements include facing spaced apart longitudinally extending surfaces parallel of said stream and said biasing means includes at least one spring mounted between said surfaces urging said second element toward the other of said bases.

11. Apparatus as set forth in claim 9, wherein:

said first and second elements are slidably interconnected for relative movement in a direction laterally transverse to said stream.

12. Apparatus as set forth in claim 11, including:

lock means for securing said first and second elements against relative laterally transverse movement.

13. Apparatus as set forth in claim 9, wherein:

each of said bases includes a first element engaged by said adjusting means for movement toward and away from the other of said bases and a second element mounted for lateral sliding movement relative to said first element and supporting an endless jogger belt thereon and means for biasing said second element toward an opposite one of said bases.

* * * * *